US011486304B2

(12) United States Patent
Jones et al.

(10) Patent No.: US 11,486,304 B2
(45) Date of Patent: Nov. 1, 2022

(54) LEVER WITH PRE-ATTACHED SELF LOCKING NUT FOR A VARIABLE TURBINE GEOMETRY TURBOCHARGER

(71) Applicant: BorgWarner Inc., Auburn Hills, MI (US)

(72) Inventors: Eric Andrew Jones, Fletcher, NC (US); George Heddy, Hendersonville, NC (US); Simon Jennings, West Yorkshire (GB)

(73) Assignee: BorgWarner Inc., Auburn Hills, MI (US)

( * ) Notice: Subject to any disclaimer, the term of this patent is extended or adjusted under 35 U.S.C. 154(b) by 183 days.

(21) Appl. No.: 15/803,426

(22) Filed: Nov. 3, 2017

(65) Prior Publication Data

US 2019/0136762 A1 May 9, 2019

(51) Int. Cl.
*F02C 6/12* (2006.01)
*F01D 17/16* (2006.01)
(Continued)

(52) U.S. Cl.
CPC .............. *F02C 6/12* (2013.01); *F01D 17/145* (2013.01); *F01D 17/165* (2013.01);
(Continued)

(58) Field of Classification Search
CPC ..... F01D 17/14–18; F02B 37/183–186; Y02T 10/144
See application file for complete search history.

(56) References Cited

U.S. PATENT DOCUMENTS 3,013,437 A * 12/1961 Harding .................... F16C 3/28
74/469
5,203,656 A * 4/1993 McKinlay ............... F16B 39/24
411/149
(Continued)

FOREIGN PATENT DOCUMENTS

EP        1927670 A1 *  6/2008  ............. C23C 28/00
GB        2217790 A  * 11/1989  ........... F01D 17/162
(Continued)

OTHER PUBLICATIONS

International Search Report related to Application No. PCT/US2018/059217; dated Apr. 17, 2019.

*Primary Examiner* — Laert Dounis
(74) *Attorney, Agent, or Firm* — von Briesen & Roper, s.c.

(57) ABSTRACT

An actuator assembly for a variable turbine geometry (VTG) turbocharger is disclosed. The actuator assembly may include an actuator and an actuator linkage having a first end coupled to the actuator and a second end defining a linkage joint. The actuator assembly may further include a VTG lever having a ball stud bore extending through the VTG lever. Additionally, the actuator assembly may include a ball stud including a first end partially disposed within the linkage joint and a second threaded end extending axially through the ball stud bore. Furthermore, a nut may be aligned with the ball stud bore and movably attached to the VTG lever prior to extending the ball stud through the ball stud bore, wherein the ball stud engages with the nut and fastens the ball stud to the VTG lever to operatively couple the VTG lever to the actuator linkage.

13 Claims, 7 Drawing Sheets

(51) Int. Cl.
- *F01D 17/14* (2006.01)
- *F01D 25/24* (2006.01)
- *F01L 1/18* (2006.01)
- *F02B 37/18* (2006.01)
- *F16C 11/06* (2006.01)

(52) U.S. Cl.
CPC ............ *F01D 25/243* (2013.01); *F01L 1/181* (2013.01); *F02B 37/186* (2013.01); *F16C 11/0604* (2013.01); *F05D 2220/40* (2013.01); *F05D 2230/642* (2013.01); *F05D 2240/54* (2013.01); *F05D 2250/241* (2013.01); *F05D 2260/31* (2013.01); *F05D 2260/50* (2013.01); *F05D 2260/56* (2013.01); *F05D 2260/57* (2013.01); *F16C 2360/24* (2013.01)

(56) References Cited

U.S. PATENT DOCUMENTS

| | | | |
|---|---|---|---|
| 8,506,223 B2* | 8/2013 | McKinlay | F16B 39/24 411/147 |
| 8,806,867 B2 | 8/2014 | Hayashi et al. | |
| 10,240,517 B2* | 3/2019 | Jaegle | F02B 37/186 |
| 2006/0133890 A1* | 6/2006 | Etoile | F16C 11/0614 403/122 |
| 2008/0022505 A1* | 1/2008 | Vogel | B21K 1/702 29/525.02 |
| 2012/0076641 A1* | 3/2012 | Jarrett, Jr. | F01D 17/162 415/160 |
| 2012/0315164 A1 | 12/2012 | Mayernick et al. | |
| 2013/0160604 A1 | 6/2013 | McNeil | |
| 2014/0140786 A1* | 5/2014 | McKinlay | F16B 39/24 411/147 |
| 2015/0107404 A1* | 4/2015 | Heidingsfelder | F16D 1/06 74/586 |
| 2016/0076582 A1* | 3/2016 | Bucking | F16C 11/08 403/122 |
| 2016/0258315 A1* | 9/2016 | Vintinner | F01D 17/14 |
| 2017/0030401 A1* | 2/2017 | Bucking | F16C 11/0604 |

FOREIGN PATENT DOCUMENTS

| | | | |
|---|---|---|---|
| GB | 2470586 A * | 12/2010 | ........ F01D 17/162 |
| GB | 2491554 B | 2/2011 | |
| JP | H07158631 A | 6/1995 | |
| JP | 2005240905 A | 9/2005 | |
| WO | 2013163013 A1 | 10/2013 | |
| WO | 2014172144 A1 | 10/2014 | |

* cited by examiner

LEVER WITH PRE-ATTACHED SELF LOCKING NUT FOR A VARIABLE TURBINE GEOMETRY TURBOCHARGER

TECHNICAL FIELD

The present disclosure generally relates to turbochargers and, more specifically, to self-locking nuts that are pre-assembled onto assemblies prior to assembly of variable turbine geometry (VTG) turbochargers.

BACKGROUND

Turbochargers are used in numerous applications such as automotive, marine, industrial and aerospace applications. Turbochargers may provide a pressure increase (or boost) in the intake air over atmospheric pressures to increase the power output of the engine. A turbocharger may include a turbine section having a turbine wheel, a compressor section having a compressor wheel, and a bearing section housing a shaft that interconnects the turbine wheel and the compressor wheel. The turbine wheel may extract energy from exhaust gases to drive the compressor via the interconnecting shaft, while the compressor wheel may increase the pressure of intake air for delivery to the combustion chamber of the engine.

Some turbocharger designs may include a wastegate or a valve that opens to divert exhaust gases away from the turbine wheel when the turbocharger boost reaches a pressure threshold. In contrast, variable turbine geometry (VTG) turbochargers may not require a wastegate. In VTG turbochargers, the turbine output may be regulated with guide vanes that surround the turbine wheel at the turbine inlet. The guide vanes may open and close to control the flow of exhaust gases onto the turbine wheel in order to maximize turbocharger boost under varying operating conditions.

A pneumatic or electronic actuator assembly may control opening and closing of the guide vanes through the actuation or other such movement of an actuation pivot shaft (APS) housed in the turbocharger bearing section. The APS may be operatively coupled to other components of the actuator assembly such as a VTG lever. Furthermore, the VTG lever may be operatively coupled to an actuator linkage, which in turn may be operatively coupled to the actuator. As a result, during turbocharger operation the actuator may be selectively controlled to open and close the guide vanes of the VTG turbocharger as needed. The VTG lever and the actuator linkage may be operatively coupled together using fasteners such as threaded bolts, nuts, pins and the like. Space within the internal portions of the VTG turbocharger is limited creating tight clearance between the VTG lever, the actuator linkage, the APS, the bearing housing (BH) and other such turbocharger components.

In some VTG turbochargers, the tight clearance between the actuator linkage, the VTG lever, and the fastening device create a small working area that may negatively impact assembly time and repair procedures. Furthermore, current VTG turbochargers may incorporate fastening devices that include a bolt extending through the VTG lever and being secured with a loose nut. Development of fastening devices that are easy to use in tight spaces may help reduce assembly time and achieve manufacturing targets. However, fabrication of such devices may increase the part count of the actuator assembly, which in turn may further increase manufacturing costs. Additionally, new fastening devices need to be compatible with the current materials used to fabricate the VTG lever, actuator linkage and other such components.

Moreover, suitable fastening devices will include capabilities of withstanding high operating temperatures and providing resistance to corrosion. Furthermore, fastening devices incorporated into the actuation assembly and other turbocharger components should have a low failure rate and a service life that matches the service life of the turbocharger and the vehicle or machinery in which it is installed.

UK Patent Application Publication No. 2491554 (hereinafter the '554 publication) discloses an actuator assembly for a turbocharger wastegate valve assembly. The actuator assembly includes an actuator coupled to an elongate actuator rod which in turn is coupled to the wastegate valve assembly. A connecting element such as a nut is arranged at an end of the elongate actuator rod and used to fix the elongate actuator rod to a link arm of the valve assembly. However, the '554 publication does not provide a fastening device which satisfies all of the current needs.

SUMMARY

In accordance with one aspect of the present disclosure, an actuator assembly for a variable turbine geometry (VTG) turbocharger is disclosed. The actuator assembly may include an actuator and an actuator linkage including a first end operatively coupled to the actuator and a second end defining a linkage joint. The actuator assembly may further include a VTG lever having a ball stud bore extending through the VTG lever. Additionally, a ball stud, including a first end partially disposed within the linkage joint and a second threaded end extending axially through the ball stud bore. Furthermore, a nut may be aligned with the ball stud bore and movably attached to the VTG lever prior to extending the ball stud through the ball stud bore, wherein the ball stud engages with the nut and fastens the ball stud to the VTG lever to operatively couple the VTG lever to the actuator linkage.

In accordance with another aspect of the present disclosure, a variable turbine geometry (VTG) lever for a VTG turbocharger is disclosed. The VTG lever may include a ball stud bore formed in a first end of the VTG lever and an actuation pivot shaft (APS) bore formed in a second end of the VTG lever. Furthermore, the VTG lever may include a nut movably attached to the first end of the VTG lever and aligned with the ball stud bore, wherein the nut engages with a ball stud inserted into the ball stud bore such that the nut fixedly attaches the ball stud to the VTG lever.

In accordance with another aspect of the present disclosure, a method of assembling an actuator assembly of a variable turbine geometry (VTG) turbocharger is disclosed. The method may include aligning a nut with a ball stud bore of a VTG lever of the VTG turbocharger, wherein the ball stud bore includes a first bore opening in a first side of the VTG lever, a second bore opening in a second side of the VTG lever, and a collar chamber disposed there between, wherein the first bore opening, the collar chamber and the second bore opening are positioned in axial alignment between the first side and the second side of the VTG lever, and wherein the nut includes a nut collar in a non-flared state. The method may further include inserting the nut into the second bore opening on the second side of the VTG lever such that the nut collar extends into the collar chamber. Moreover, the method may further include deforming at least a portion of the nut collar in the non-flared state to define a flared collar portion and a non-flared collar portion of the nut collar, wherein the flared collar portion of the nut collar extends radially outward into the collar chamber.

These and other aspects and features of the present disclosure will be more readily understood when read in conjunction with the accompanying drawings.

DETAILED DESCRIPTION

Figure 1:
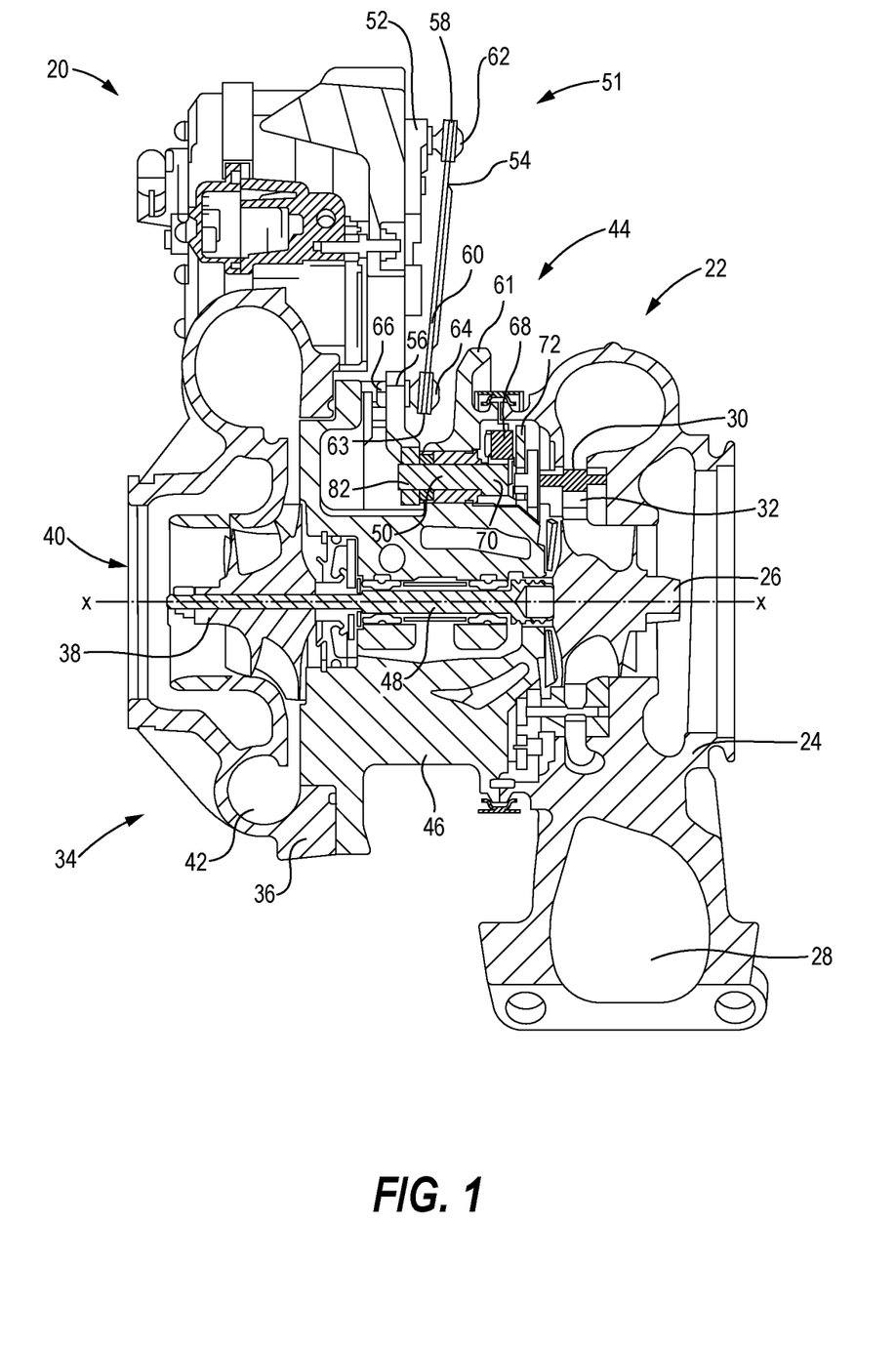
FIG. 1 is a cross-sectional view of a variable turbine geometry (VTG) turbocharger having an actuator assembly, constructed in accordance with an embodiment of the present disclosure.

Referring now to the drawings and with specific reference to FIG. 1, a variable turbine geometry (VTG) turbocharger 20 according to one embodiment is shown. As will be apparent to those skilled in the art, the illustrated VTG turbocharger 20 operates by pressurizing intake air for a combustion chamber of an internal combustion engine, allowing increased engine efficiency and power output. The turbocharger 20 may be a component of an automotive vehicle, although it may be used in other applications as well such as, but not limited to, marine applications, off-highway applications, agricultural applications, aircraft applications and the like.

The illustrated VTG turbocharger 20 includes a turbine portion 22 that further includes a turbine housing 24 enclosing a turbine wheel 26. The turbine housing 24 also defines a volute 28 through which exhaust gases from the internal combustion engine (not shown) are channeled into the turbine wheel 26 via a throat 30. At the throat 30 of the volute 28, a plurality of guide vanes 32 surround the turbine wheel 26. The guide vanes 32 pivot about respective axes to change angles in order to increase or decrease openings there between, thereby regulating a flow of the exhaust gases to the turbine wheel 26. Furthermore, the illustrated VTG turbocharger 20 comprises a compressor portion 34 includes a compressor housing 36 enclosing a compressor wheel 38 and defining an air inlet 40, a diffuser portion 42, and a compressor outlet (not shown). Additionally, a bearing portion 44 is disposed between the turbine portion 22 and the compressor portion 34. The bearing portion 44 includes a bearing housing 46 that encloses a rotatable shaft 48 positioned along an axis X-X of the illustrated VTG turbocharger 20. The rotatable shaft 48 interconnects the turbine wheel 26 and the compressor wheel 38.

In operation, exhaust gases from the internal combustion engine (not shown) enter the turbine portion 22 through a turbine inlet (not shown) and the exhaust gases flow to the turbine wheel 26 via the volute 28 and the throat 30. The volute 28 directs the exhaust gases along a path that is at least partially tangential to the turbine wheel 26, causing the turbine wheel 26 to rotate. Rotation of the turbine wheel 26, in turn, drives or otherwise facilitates a corresponding rotation of the compressor wheel 38 via the rotatable shaft 48. Intake air is directed to the compressor wheel 38 via the air inlet 40 of the compressor portion 34. Rotation of the compressor wheel 38 increases a velocity of the intake air which is expelled into the diffuser portion 42, raising the pressure of the intake air before the intake air is delivered to the combustion chamber of the internal combustion engine through the compressor outlet (not shown).

Depending on different operating conditions, the output of the illustrated VTG turbocharger 20 may be regulated through selective control of the opening and closing of the guide vanes 32 located in the turbine portion 22. In an embodiment, actuation or other such control of the opening and closing of the guide vanes 32 may be effectuated by an actuation pivot shaft (APS) 50 partially housed in the bearing portion 44. More specifically, an actuation assembly 51 including an actuator 52, the APS 50, an actuator intermediate linkage 54 and a VTG lever 56 is configured to control the opening and closing of the guide vanes 32. In one non-limiting example, the actuator 52, such as but not limited to, a pneumatic actuator, an electronic actuator or other such actuator, drives the movement of the actuator intermediate linkage 54, which is operatively coupled to the actuator 52. The actuator 52 is coupled to a first end 58 of the actuator intermediate linkage 54. Furthermore, a second end 60 of the actuator intermediate linkage 54 is coupled to the VTG lever 56, and the VTG lever 56 is further coupled to the APS 50. A cast-in heat shield 61 is also integrated with the bearing housing 46 to provide heat protection to the actuator intermediate linkage 54. More specifically, the cast-in heat shield 61 is configured to protect a polymeric ball stud race 63 incorporated into the second end 60 of the actuator intermediate linkage 54 against elevated operating temperatures and other operational and environmental conditions. Moreover, in an embodiment, the first end 58 of the actuator intermediate linkage 54 is operatively coupled to the actuator 52 using a first ball stud 62, or other such fastening device, and the second end 60 of the actuator intermediate linkage 54 is operatively coupled to the VTG lever 56 using a second ball stud 64, or other such fastening device. Additionally, a nut 66 is used to secure the second ball stud 64 to the VTG lever 56. Similarly, a nut or other such threaded device (not shown) is used to secure the first ball stud 62 to the actuator 52.

During operation of the illustrated VTG turbocharger 20, the actuator 52 via the actuator intermediate linkage 54 drives the actuation or other such movement of the VTG lever 56. The VTG lever 56 subsequently drives or otherwise causes rotation of the APS 50 which in turn, drives the movement of a block/pin assembly 68 engaged with a head 70 of the APS 50. The block/pin assembly 68 in turn, drives the movement of an adjustment ring 72 to subsequently adjust the angle of the guide vanes 32. As a result, torque is transmitted through the actuation assembly 51, from the actuator 52 to the APS 50 via the actuator intermediate linkage 54 and VTG lever 56, to accordingly adjust the guide vanes 32, as needed.

Figure 2:
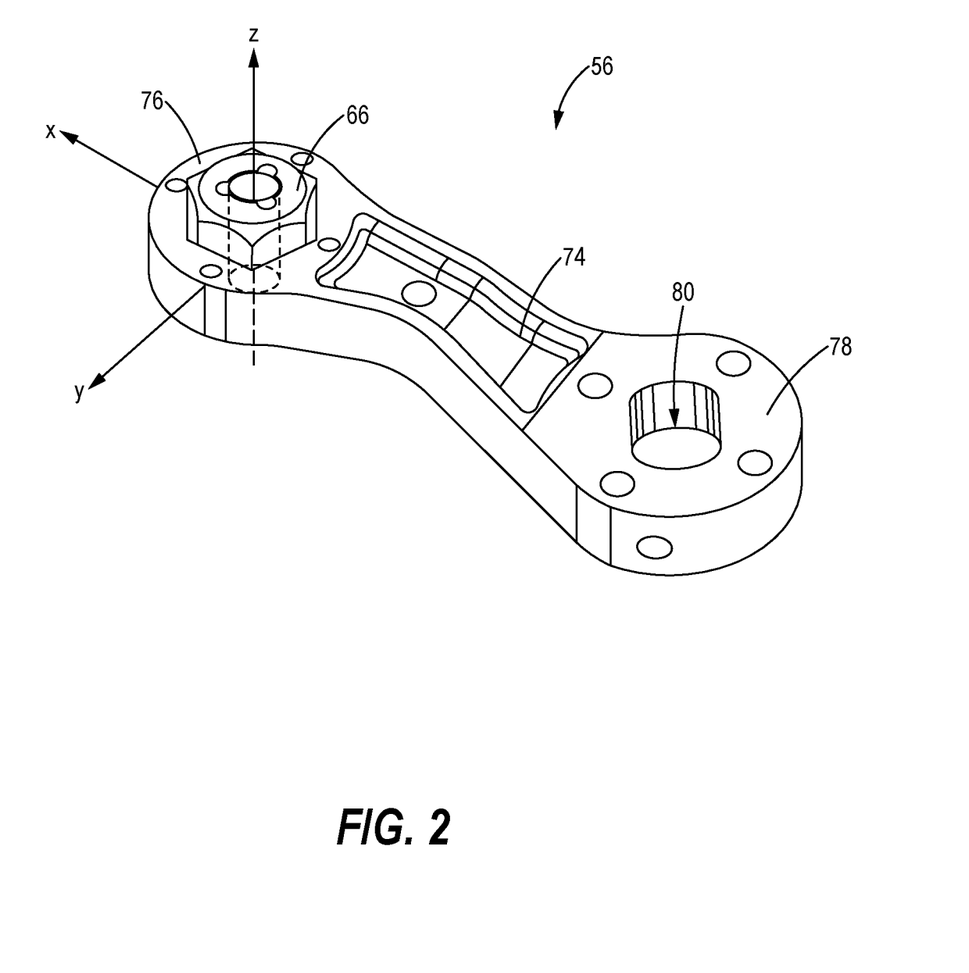
FIG. 2 is a perspective view of a VTG lever incorporated into the VTG turbocharger of FIG. 1, constructed in accordance with an embodiment of the present disclosure.

Referring to FIG. 2 with continued reference to FIG. 1, one non-limiting embodiment of the VTG lever 56 includes a body portion 74, a first end 76 and a second end 78. As illustrated in FIG. 1, the VTG lever 56 is orientated within the VTG turbocharger 20 such that the first end 76 mates with or otherwise accepts the second ball stud 64. The second ball stud 64 is secured or otherwise attached to the first end 76 of the VTG lever 56 by the nut 66. In one non-limiting example, the nut 66 is pre-assembled to the first end 76 of the VTG lever 56 prior to inserting or otherwise assembling the VTG lever 56 within the VTG turbocharger 20. Additionally, the second end 78 of the VTG lever 56 includes an APS shaft bore 80 such that an end portion 82 (FIG. 1) of the APS 50 extends through the APS shaft bore 80 to operatively couple the VTG lever 56 with the APS 50. In one non-limiting example, the APS shaft bore 80 has an extended oval shape (i.e., like an oval race-track), however other corresponding shapes are possible to couple the VTG lever 56 with the APS 50.

In an embodiment, the nut 66 and the VTG lever 56 are fabricated out of dissimilar materials which exhibit different material properties. For example, the nut 66 can be made from a ductile material while the VTG lever 56 can be formed out of a non-ductile material; however other materials having similar or dissimilar material properties may be used. Furthermore, the VTG lever 56 illustrated in FIG. 2 is fabricated using a metal injection molding (MIM) process; however other fabrication processes such as but not limited to, machining, casting, molding and the like are possible. Using a MIM process may be advantageous because it is a robust fabrication process that allows complex parts to be fabricated quickly and in high volume.

Figure 3:
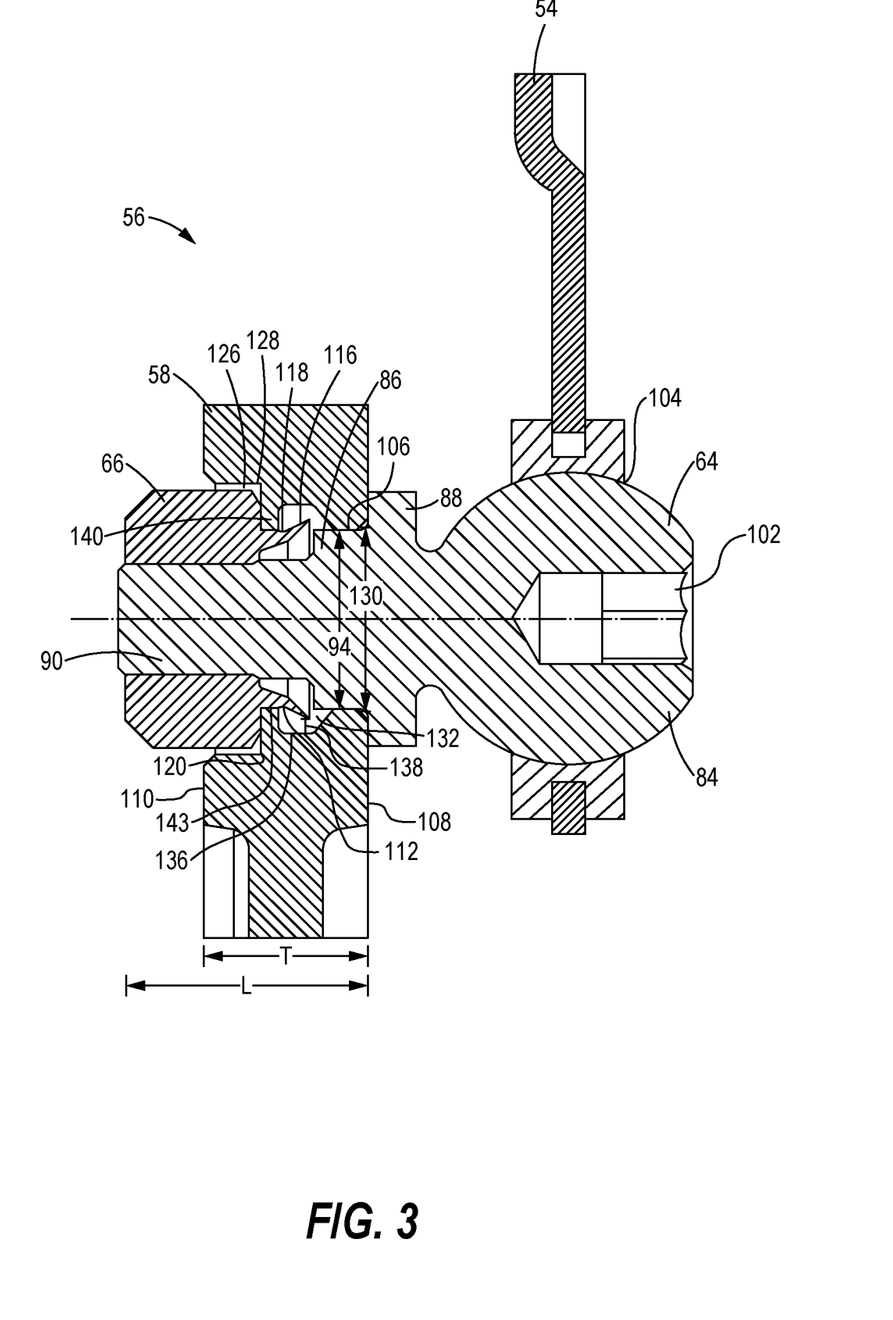
FIG. 3 is a partial cross-sectional view of the actuator assembly of FIG. 1, constructed in accordance with an embodiment the present disclosure.
Figure 4:
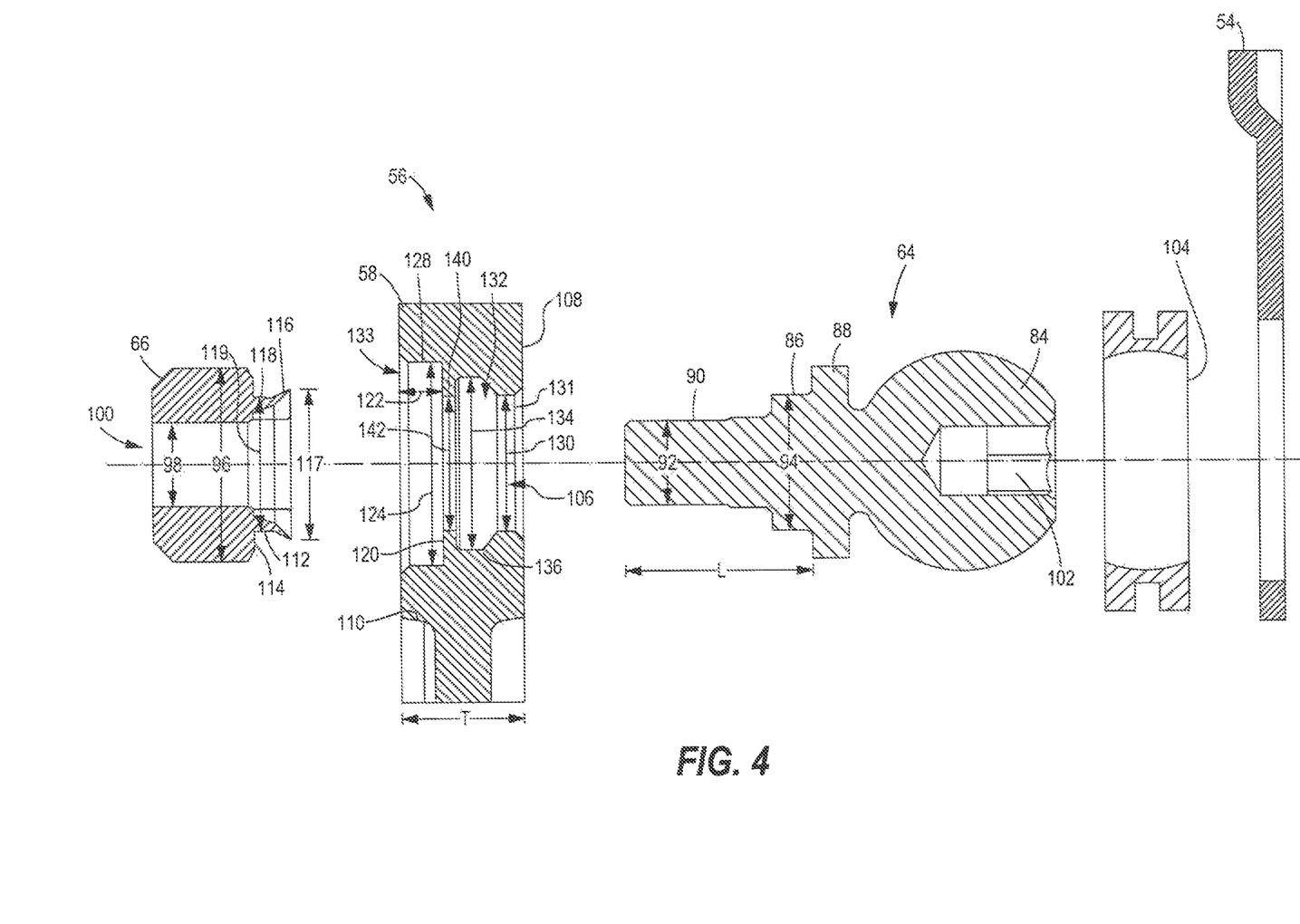
FIG. 4 is an exploded partial cross-sectional view of the actuator assembly of FIG. 3, constructed in accordance with an embodiment of the present disclosure.

Referring now to FIGS. 3 and 4, a partial cross-sectional view and exploded partial cross sectional view, respectively, of an embodiment of the actuator intermediate linkage 54 and VTG lever 56 is illustrated. As discussed above, in one embodiment of the actuation assembly 51 (FIG. 1), the actuator intermediate linkage 54 and VTG lever 56 are operatively coupled to each other by the second ball stud 64 and nut 66. The second ball stud 64 includes a ball portion 84 and a shaft portion 86 extending axially away from the ball portion 84. Furthermore a flange portion 88 is disposed between the ball portion 84 and the shaft portion 86. In some embodiments, the shaft portion 86 further includes a threaded shaft portion 90 having a set of threads (not shown) circumferentially formed around the surface of the threaded shaft portion 90.

In an embodiment, the threaded shaft portion 90 further includes a threaded shaft diameter 92 that is smaller than a shaft diameter 94 of the shaft portion 86. Furthermore, the nut 66 is configured with an outer diameter 96 and an inner diameter 98; the inner diameter 98 defining a nut aperture 100 having a set of threads (not shown) circumferentially formed around the surface of the nut aperture 100. Additionally, the ball portion 84 of the second ball stud 64 includes a hex head 102 formed into at least a portion of the of the ball portion 84 and the hex head 102 may be used to thread or otherwise couple the second ball stud 64 with the nut 66.

The shaft portion 86 of the second ball stud 64 can be configured such that the threaded shaft diameter 92 of the threaded shaft portion 90 is substantially the same size as the inner diameter 98 of the nut 66. Moreover, a set of threads (not shown) are circumferentially formed around the surface of the threaded shaft portion 90 and a corresponding set of threads (not shown) are similarly be circumferentially formed around the surface of the nut aperture 100 such that the nut 66 is threaded or otherwise coupled onto the threaded shaft portion 90 to secure the second ball stud 64 to the VTG lever 56. Furthermore, a tool (e.g., hex wrench, screwdriver, socket wrench) may be inserted into the hex head 102 to screw, tighten, or otherwise couple the second ball stud 64 and the nut 66.

During assembly or repair of the VTG turbocharger 20 (FIG. 1), the second ball stud 64 is orientated such that the ball portion 84 extends through a linkage joint 104 formed or otherwise defined in a portion of the actuator intermediate linkage 54. As a result, the ball portion 84 of the second ball stud 64 is coupled to the actuator intermediate linkage 54 at the linkage joint 104. Furthermore, an embodiment of the VTG lever 56 includes a ball stud bore 106 that extends through the VTG lever 56 from a first side 108 to a second side 110. The second ball stud 64 can be positioned such that the shaft portion 86 and threaded shaft portion 90 are aligned with and inserted into the ball stud bore 106 of the VTG lever 56. In some embodiments, when the second ball stud 64 is fully inserted into the ball stud bore 106 the flange portion 88 is in direct contact with a portion of the first side 108 of the VTG lever 56 adjacent to the ball stud bore 106. Moreover, the shaft portion 86 and the threaded shaft portion 90 have a length L greater than a thickness T of the VTG lever 56 such that at least a portion of the threaded shaft portion 90 extends axially exterior to the second side 110 of the VTG lever 56. As a result, the nut 66 threads onto or otherwise mates with the threaded shaft portion 90 extending through the ball stud bore 106 to secure the second ball stud 64 to the VTG lever 56.

In an embodiment, the nut 66 further includes a nut collar 112 circumferentially surrounding the nut aperture 100 and extending axially away from a first surface 114 of the nut 66. Furthermore, the nut collar 112 includes a flared collar portion 116 with a flared collar diameter 117 and a non-flared collar portion 118 with a non-flared collar diameter 119. In some embodiments, the flared collar diameter 117 is larger than the non-flared collar diameter 119 such that the sidewall of the flared collar portion 116 is angled radially outward relative to the sidewall of the of the non-flared collar portion 118. In an embodiment of the VTG lever 56, the nut 66 is pre-assembled or otherwise attached to the second side 110 of the VTG lever 56 prior to assembly of the VTG turbocharger 20 (FIG. 1). Moreover, the nut 66 is loosely held in place by the nut collar 112 within a portion of the ball stud bore 106. Additionally, a nut recess 120 is formed or otherwise defined in the second side 110 of the VTG lever 56. The nut recess 120 extends a depth 122 into a portion of the VTG lever 56 such that at least a portion of the nut 66 resides within the nut recess 120 when the nut 66 is pre-assembled or otherwise attached to the VTG lever 56. Furthermore, in some embodiments the nut recess 120 helps secure and keep the nut 66 from rotating while the second ball stud 64 is threaded into or otherwise coupled to the nut 66. Additionally, the nut recess 120 includes a recess diameter 124 that is larger than the outer diameter 96 of the nut 66. As a result, a gap 126 or other such radial spacing is defined between the nut 66 and a recess sidewall 128 when the nut 66 is positioned within the nut recess 120.

In one non-limiting example, the ball stud bore 106 is formed through the VTG lever 56 to include dimensions and features which correspond to the pre-assembly of the nut 66 on the second side 110 of the VTG lever 56 prior to coupling the second ball stud 64 with the VTG lever 56. For example, in an embodiment, the ball stud bore 106 is formed to extend through the VTG lever 56 from the first side 108 to the opposing second side 110 of the VTG lever 56. Moreover, the ball stud bore 106 has a first bore diameter 130 sized such that the second ball stud 64 can be inserted into the ball stud bore 106, and the first bore diameter 130 is larger than the shaft diameter 94 of the shaft portion 86. However, as illustrated in FIGS. 3 and 4, the first bore diameter 130 is sized relative to the shaft diameter 94 in order to provide a tight fit of the second ball stud 64 within the ball stud bore 106. Therefore, as the second ball stud 64 is inserted into the ball stud bore 106, the shaft portion 86 fits into and extends through a first bore opening 131 of the ball stud bore 106 such that there is little radial movement of the shaft portion 86 within the first bore opening 131. Furthermore, when the second ball stud 64 is fully inserted into the ball stud bore 106, the flange portion 88 of the second ball stud 64 is in direct contact with the first side 108 of the VTG lever 56 and the threaded shaft portion 90 extends through a second bore opening 133 of the ball stud bore 106. As a result, at least a portion of the threaded shaft portion 90 extends axially exterior to the second side 110 of the VTG lever 56.

In an embodiment, the ball stud bore 106 further includes a collar chamber 132 formed within the thickness T of the VTG lever 56. The collar chamber 132 is disposed between the first side 108 and the second side 110 of the VTG lever 56. Furthermore, the collar chamber 132 has a collar chamber diameter 134 larger than the first bore diameter 130. Additionally, the collar chamber diameter 134 is larger than both the threaded shaft diameter 92 and the shaft diameter 94 of the second ball stud 64, as well as the flared collar diameter 117 and the non-flared collar diameter 119 of the nut collar 112. The collar chamber diameter 134 is sized or otherwise configured to provide a space for the nut collar 112 within the ball stud bore 106. As a result, a sidewall 136 of the collar chamber 132 is spaced a radial distance away from the flared collar portion 116 of the nut collar 112 to define a gap 138 between the nut collar 112 and the sidewall 136 of the collar chamber 132. The ball stud bore 106 may further include a collar tab 140 at the second bore opening 133. The collar tab 140 defines a second bore diameter 142 that is larger than the non-flared collar diameter 119 of the nut collar 112 such that the non-flared collar portion 118 of the nut collar 112 may be inserted into the collar tab 140. Moreover, a gap 143 is defined between the collar tab 140 and the non-flared collar portion 118 of the nut collar 112 to allow axial and radial movement of the nut 66 relative to the VTG lever 56.

When the nut 66 is pre-assembled or otherwise coupled with the VTG lever 56, as illustrated in FIG. 3, at least a portion of the nut 66 is positioned within the nut recess 120. The nut collar 112 is further aligned and positioned with the second bore opening 133 of the ball stud bore 106 such that the non-flared collar portion 118 extends into the collar tab 140 and the flared collar portion 116 extends through the collar tab 140 into the collar chamber 132. Furthermore, an embodiment of VTG lever 56 is configured to loosely hold the nut 66 within the ball stud bore 106 when the nut 66 is not threaded or otherwise attached to the second ball stud 64. As such, the second bore diameter 142 is defined to be slightly larger than the non-flared collar diameter 119 to allow for axial and radial movement and adjustment of the nut 66 when pre-assembled to the VTG lever 56. As a result, the nut collar 112 axially slides or otherwise moves within the ball stud bore 106 allowing the nut 66 to move axially away or axially towards second side 110 of the VTG lever 56. Additionally, the collar chamber diameter 134 is sized to allow for radial movement of the flared collar portion 116 of the nut collar 112 when pre-assembled to the VTG lever 56. Allowing the nut 66 to freely move in the radial and/or axial direction helps center and/or align the nut 66 with the second ball stud 64 as the second ball stud 64 is inserted through the ball stud bore 106 and threaded or otherwise coupled with the nut 66. Furthermore, axial and radial movement of the nut 66 can position the nut 66 within the nut recess 120 such that the VTG lever 56 keeps the nut 66 from rotating or spinning while being threaded or otherwise coupled to the second ball stud 64. In one non-limiting example the nut recess 120 includes a hexagonal shape that corresponds to the shape of the nut 66; however, other rotation limiting geometries of the nut recess 120 are possible.

Figure 5:
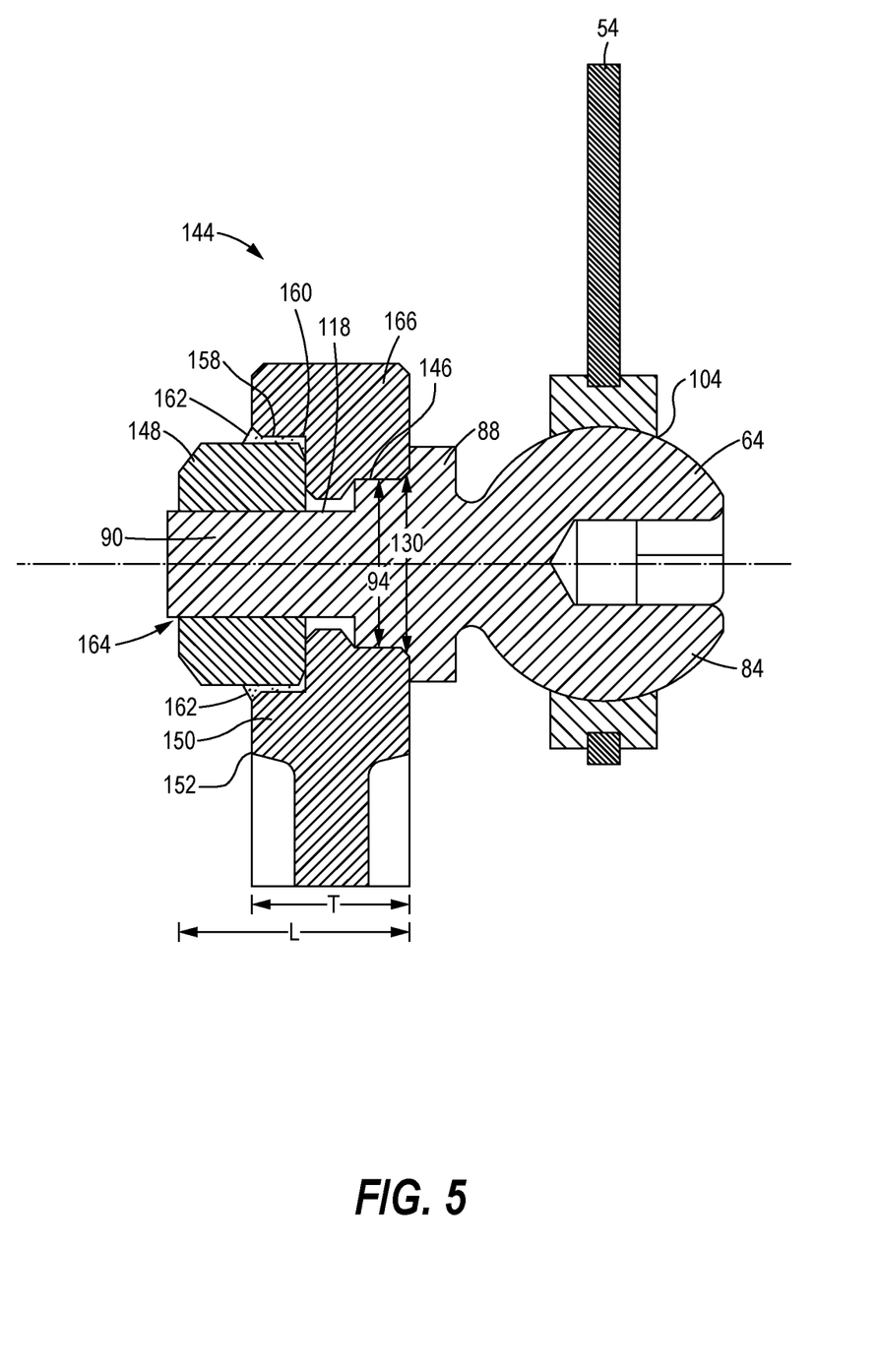
FIG. 5 is a partial cross-sectional view of the actuator assembly of FIG. 1, constructed in accordance with an embodiment of the present disclosure.
Figure 6:
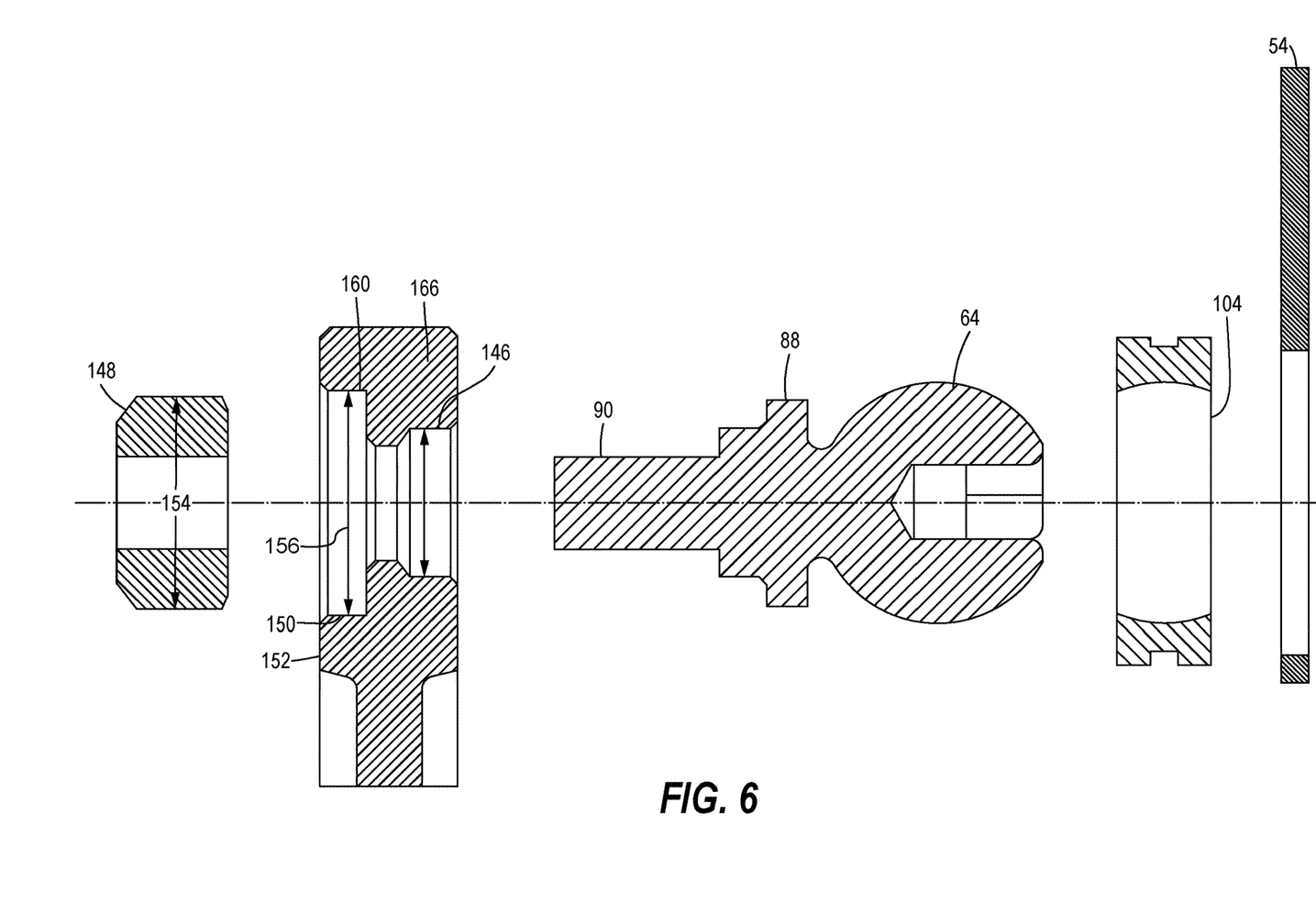
FIG. 6 is an exploded partial cross-sectional view of the actuator assembly of FIG. 5, constructed in accordance with an embodiment of the present disclosure.

Referring now to FIGS. 5 and 6, an alternative embodiment of a VTG level 144 is illustrated. The VTG lever 144 includes a ball stud bore 146 extending through the VTG lever 144. Moreover, a nut 148 partially resides within a nut recess 150 formed in a second side 152 of the VTG lever 144. The nut 148 has a nut outer diameter 154 and the nut recess 120 has a nut recess diameter 156 that is larger than the nut outer diameter 154. As a result, when the nut 148 is positioned within the nut recess 150 a gap 158 is defined between a sidewall 160 of the nut recess 150 and the nut 148.

In an embodiment, the nut 148 is pre-assembled onto the VTG lever 144 by positioning the nut 148 within the nut recess 150. In one non-limiting example, once the nut 148 is positioned within the nut recess 150 an attachment material 162 is dispensed between the nut 148 and sidewall 160 of the nut recess 150 thereby filling the gap 158. Furthermore, the attachment material 162 forms a fillet, or other such structure, which fixedly attaches the nut 148 to the second side 152 of the VTG lever 144. In an embodiment, the attachment material 162 is an adhesive material such as but not limited to, an acrylic, epoxy, silicone, UV curable, or other such adhesive material. Alternatively, the nut 148 can be welded to the second side 152 of the VTG lever 144 and the attachment material 162 forms a weld that fills in the gap 158 to fixedly attach the nut 148 to the VTG lever 144. Similar to the embodiment illustrated in FIGS. 3 and 4, the VTG lever 144 and nut 148 are configured to perform in harsh environmental conditions such as but not limited to, extreme temperate, corrosive environment, mechanical shock, vibration, and other such operational conditions When the nut 148 is pre-assembled to the VTG lever 144, as illustrated in FIG. 5, the nut 148 is aligned with the ball stud bore 146 and at least a portion of the nut 148 resides within the nut recess 150. Furthermore, the nut 148 is fixedly attached and remains in a stationary position relative to the VTG lever 144. The second ball stud 64 can be inserted into the ball stud bore 146 and the threaded shaft portion 90 corresponds to the threads circumferentially formed around a nut aperture 164 of the nut 148. As a result, the second ball stud 64 is threaded into the nut 148 such that the VTG lever 144 is operatively coupled with the actuator intermediate linkage 54. Furthermore, when the second ball stud 64 is fully threaded into or otherwise coupled with the nut 148 the flange portion 88 of the second ball stud 64 is in direct contact with a first side 166 of the VTG lever 144.

INDUSTRIAL APPLICABILITY

In general, the teachings of the present disclosure may find broad applicability in many industries including, but not limited to, automotive, marine, aerospace, construction, industrial, and transportation industries. More specifically, the teachings of the present disclosure may find applicability in vehicles, machines or other such equipment that include turbochargers such as the illustrated VTG turbocharger 20, described above. In some embodiments, the nut 66 is pre-assembled onto the VTG lever 56 prior to incorporating the VTG lever 56 with the actuation assembly 51 during VTG turbocharger 20 assembly. Pre-assembly of the VTG lever 56 and nut 66 assembly may help improve installation efficiency of the VTG lever 56, thereby helping reduce the overall assembly time of the VTG turbocharger 20. For example, the pre-assembled VTG lever 56 and nut 66 helps manufacturers meet or exceed production targets by facilitating rapid coupling of the actuator intermediate linkage 54 and the VTG lever 56 in high volume production. Additionally, the pre-assembled VTG lever 56 and nut 66 provides a low cost component that is capable of withstanding the harsh operating conditions and is compatible with the tight design specifications of the VTG turbocharger 20.

In an embodiment, the nut 66 used to attach or otherwise couple the VTG lever 56 to the actuator intermediate linkage 54 is in a hard to reach location. As a result, assembly of the VTG turbocharger 20 requires manual manipulation by an assembly technician to position, align and tighten a non-attached nut with a ball stud or other fastening device to couple or otherwise attach the VTG lever 56 to the actuator intermediate linkage 54. Incorporating the pre-assembled VTG lever 56 and nut 66, as described in the present disclosure, loosely holds the nut 66 in alignment with the ball stud bore 106 formed through the VTG lever 56. The nut 66 may be capable of self-adjusting in the axial and/or radial directions in order to properly align with the second ball stud 64 during assembly. As a result, when the second ball stud 64 is inserted into the ball stud bore 106, the nut 66 properly aligns with the threads of the second ball stud 64 and does not require manual alignment or other such input from the assembly technician. Furthermore, the nut 66 and second ball stud 64, as described in the present disclosure, incorporate the same number or fewer number of parts as other designs used to operably couple the VTG lever 56 to the actuator intermediate linkage 54 of the VTG turbocharger 20.

Figure 7:
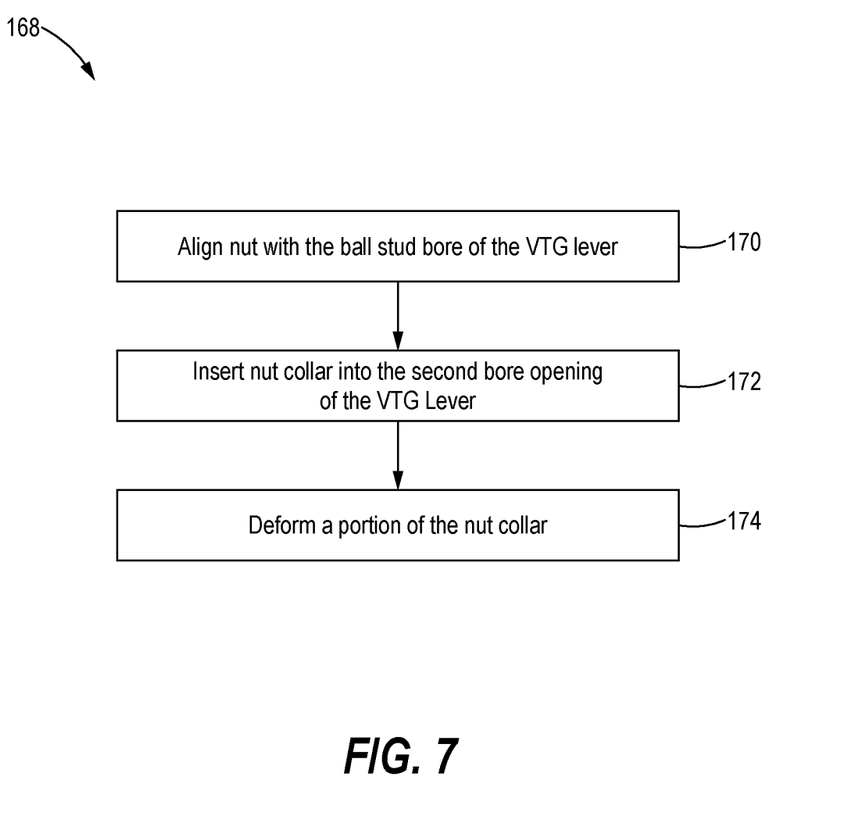
FIG. 7 is a flowchart of a method that may be involved in assembling the actuator assembly, in accordance with a method of the present disclosure.

Turning to FIG. 7, one non-limiting example of a method 168 used for assembly of the actuation assembly 51 of the VTG turbocharger 20 is illustrated. At a first block 170, the nut 66 is aligned with the ball stud bore 106 of the VTG lever 56. The ball stud bore 106 includes the first bore opening 131 in the first side 108 of the VTG lever 56 and the second bore opening 133 in the formed in the second side 110 of the VTG lever 56. Additionally, the collar chamber 132 is formed within the thickness of the VTG lever 56 and the collar chamber 132 is disposed between the first and second sides 108, 110 of the VTG lever 56. As a result, the VTG lever 56 specifies the ball stud bore 106 to arrange the first bore diameter 130, the collar chamber 132, the collar chamber diameter 134, the collar tab 140, the nut recess 120 and other such design features in axial alignment with one another. Furthermore, the nut 66 includes the nut collar 112 that extends axially away from the first surface 114 of the nut 66. The nut collar 112 is generally in a non-flared state and circumferentially surrounds the nut aperture 100.

In an embodiment, the first bore diameter 130 is sized according to the size of the shaft portion 86 of the second ball stud 64. The first bore diameter 130 is larger than the shaft diameter 94 to allow the second ball stud 64 to be inserted into the ball stud bore 106. However, the size of first bore diameter 130 relative to the size of the shaft diameter 94 is configured such that the shaft portion 86 is secured tightly (i.e., minimal radial movement) within the first bore diameter 130 in order to withstand operational conditions of the VTG turbocharger 20 such as but not limited to, engine vibration, increased temperature and other such operational conditions. Additionally, the collar chamber 132 includes the collar chamber diameter 134 to be larger than the first bore diameter 130. As a result, the collar chamber 132 defines an interior area within the VTG lever 56 having a diameter larger than the diameter of the first bore diameter 130. The collar chamber 132 opens into the nut recess 120 at the second bore opening 133 defined by the second bore diameter 142. Generally, the second bore diameter 142 may be specified to be smaller than the collar chamber diameter 134. In some embodiments, the collar tab 140 feature of the ball stud bore 106 is defined by the dimensions of the nut recess 120 and the collar chamber 132.

According to a next block 172, the nut 66 is aligned with the second bore opening 133 such that the nut collar 112, in the non-flared state, is inserted into the second bore opening 133 on the second side 110 of the VTG lever 56. Furthermore, the nut 66 is centered and resides within at least a portion the nut recess 120 such that as the nut collar 112 is inserted through the second bore opening 133 at least a portion of the nut collar 112 extends into the collar chamber 132.

In a next block 174, at least a portion of the nut collar 112 is deformed to define a flared collar portion 116 and a non-flared collar portion 118 of the nut collar 112. In one non-limiting example, deforming the nut collar 112 includes swaging the nut collar 112 to form the flared collar portion 116 and non-flared collar portion 118 of the nut collar 112. Furthermore, the nut collar 112 is swaged or otherwise deformed such that the flared collar portion 116 extends radially into the collar chamber 132 of the VTG lever 56. In an embodiment, swaging or otherwise deforming the nut collar 112 includes forming the non-flared collar diameter 119 smaller than the second bore diameter 142 thereby defining a gap 143 between the non-flared collar portion 118 of the nut collar 112 and the second bore opening 133. Additionally swaging or otherwise deforming the nut collar 112 includes forming the flared collar diameter 117 larger than the second bore diameter 142 and smaller than the collar chamber diameter 134 such that a gap 138 is defined between the flared collar portion 116 of the nut collar 112 and the sidewall 136 of the collar chamber 132. As a result, the nut 66 is loosely held by the VTG lever 56 and at least partially aligned with the ball stud bore 106. Moreover, the gaps 143, 138 provide movement and/or adjustment of the nut 66 in the axial and radial direction relative to the VTG lever 56 while the nut 66 is movably attached to the VTG lever 56.

Furthermore, an embodiment of the method 168 includes inserting the second ball stud 64 through the ball stud bore 106 such that the threaded shaft portion 90 is centered and aligned with the first bore opening 131. The threaded shaft diameter 92 is smaller than the first bore diameter 130, the collar chamber diameter 134 and the second bore diameter 142. As a result, the threaded shaft portion 90 extends through the ball stud bore 106 and engages or otherwise interacts with the nut collar 112. Additionally, the threaded shaft portion 90 of the second ball stud 64 is aligned with the nut collar 112 such that the flared collar portion 116 and non-flared collar portion 118 of the nut collar 112 adjust the position of the nut 66 in the axial and/or radial direction based on the engagement between the nut collar 112 and the second ball stud 64.

Finally, the nut 66 is fastened or threaded onto the threaded shaft portion 90 in order to secure the second ball stud 64 to the VTG lever 56. A tool such as a hex wrench, screwdriver, socket wrench or other such tool, is inserted into the hex head 102 to thread the second ball stud 64 into the nut 66. In an embodiment, the nut 66 is at least partially retained within the nut recess 120 to keep the nut 66 from spinning or otherwise rotating while the second ball stud 64 is threaded or otherwise tightened into the nut 66.

While the forgoing detailed description has been provided with respect to certain specific embodiments, it is to be understood the scope of the disclosure should not be limited to such embodiments. The breadth and spirit of the present disclosure is broader than the embodiments specifically disclosed and encompassed within the following claims. Moreover, while some features are described in conjunction with certain specific embodiments, these features are not limited to use with only the embodiment with which they are described. Rather, aspects of the specific embodiments can be combined with or substituted by other features disclosed on conjunction with alternate embodiments.

What is claimed is:

1. An actuator assembly for a variable turbine geometry (VTG) turbocharger, the actuator assembly comprising:
    an actuator;
    an actuator linkage including a first end operatively coupled to the actuator and a second end defining a linkage joint;
    a VTG lever having a ball stud bore extending through the VTG lever;
    a ball stud, including a first end partially disposed within the linkage joint and a second threaded end extending axially through the ball stud bore;
    a nut aligned with the ball stud bore and movably attached to the VTG lever prior to extending the ball stud through the ball stud bore, wherein the ball stud engages with the nut and fastens the ball stud to the VTG lever to operatively couple the VTG lever to the actuator linkage, wherein the ball stud bore includes a first bore opening on a first side of the VTG lever, a second bore opening on a second side of the VTG lever and a collar chamber disposed there between, wherein the first bore opening, the collar chamber and the second bore opening are in axial alignment between the first side and the second side of the VTG lever, and wherein the nut includes a nut collar extending axially from a surface of the nut and at least a portion of the nut collar extends into the collar chamber; and
    a nut recess formed in the second side of the VTG lever, wherein the nut resides at least partially within the nut recess during engagement with the ball stud.

2. The actuator assembly of claim 1, wherein the nut collar is inserted through the second bore opening.

3. The actuator assembly of claim 2, wherein the nut collar includes a non-flared collar portion and a flared collar portion, the non-flared collar portion extending through the second bore opening and the flared collar portion extending into and contained within the collar chamber of the ball stud bore to movably attach the nut to the VTG lever.

4. The actuator assembly of claim 3, wherein the non-flared collar portion has a non-flared collar diameter smaller than a diameter of the second bore opening, such that a first gap is defined between the non-flared collar portion and the second bore opening, wherein the flared collar portion has a flared collar diameter smaller than a chamber diameter of the collar chamber, such that a second gap is defined between the flared collar portion and a sidewall of the collar chamber, and wherein the first and second gaps provide for axial and radial movement of the nut relative to the VTG lever while the nut is movably attached to the VTG lever.

5. The actuator assembly of claim 1, wherein the collar chamber has a chamber diameter larger than a diameter of the first bore opening and a diameter of the second bore opening.

6. The actuator assembly of claim 1, wherein the actuator assembly is operatively coupled with the VTG turbocharger, the VTG turbocharger comprising:
    a turbine portion having a turbine wheel and a plurality of guide vanes surrounding the turbine wheel, wherein the plurality of guide vanes being adjusted by the actuator assembly to regulate a flow of exhaust gases to the turbine wheel; and
    an actuation pivot shaft (APS) operatively coupled to the actuator assembly to control the flow of exhaust gases by adjusting an angle of the plurality of guide vanes according to actuation of the APS by the actuator assembly.

7. A variable turbine geometry (VTG) lever for a VTG turbocharger, the VTG lever comprising:
    a ball stud bore formed in a first end of the VTG lever;
    an actuation pivot shaft (APS) bore formed in a second end of the VTG lever; and
    a nut movably attached to the first end of the VTG lever and aligned with the ball stud bore, wherein the nut engages with a ball stud inserted into the ball stud bore such that the nut fixedly attaches the ball stud to the VTG lever, wherein the ball stud bore includes a first bore opening on a first side of the VTG lever, a second bore opening on a second side of the VTG lever and a collar chamber disposed there between, wherein the first bore opening, the collar chamber and the second bore opening are in axial alignment between the first side and the second side of the VTG lever, and wherein the collar chamber has a chamber diameter larger than a diameter of the first bore opening and a diameter of the second bore opening; and
    a nut recess formed in the second side of the VTG lever, wherein the nut resides at least partially within the nut recess during engagement between the nut and the ball stud and wherein the nut is configured to allow motion of the nut in the radial and axial directions, while limiting rotation of the nut.

8. The VTG lever of claim 7, wherein the nut includes a nut collar extending axially away from a surface of the nut, wherein the nut collar is inserted through the second bore opening and at least a portion of the nut collar extends into the collar chamber.

9. The VTG lever of claim 8, wherein the nut collar includes a non-flared collar portion and a flared collar portion, the non-flared collar portion extending through the second bore opening and the flared collar portion extending into and contained within the collar chamber of the ball stud bore to movably attach the nut to the VTG lever.

10. The VTG lever of claim 9, wherein the non-flared collar portion has a non-flared collar diameter smaller than a diameter of the second bore opening such that a first gap is defined between the non-flared collar portion and the second bore opening, wherein the flared collar portion has a flared collar diameter smaller than a chamber diameter of the collar chamber such that a second gap is defined between the flared collar portion and a sidewall of the collar chamber, and wherein the first and second gaps provide for axial and radial movement of the nut relative to the VTG lever while the nut is movably attached to the VTG lever.

11. The VTG lever of claim 7, wherein the collar chamber has a chamber diameter larger than a diameter of the first bore opening and a diameter of the second bore opening.

12. A method of assembling an actuator assembly of a variable turbine geometry (VTG) turbocharger, the method comprising:

aligning a nut with a ball stud bore of a VTG lever, wherein the ball stud bore includes a first bore opening in a first side of the VTG lever, a second bore opening in a second side of the VTG lever, and a collar chamber disposed there between, wherein the first bore opening, the collar chamber and the second bore opening are positioned in axial alignment between the first side and the second side of the VTG lever, and wherein the nut includes a nut collar in a non-flared state;

inserting the nut into the second bore opening on the second side of the VTG lever such that the nut collar extends into the collar chamber;

deforming at least a portion of the nut collar in the non-flared state to define a flared collar portion and a non-flared collar portion of the nut collar, wherein the flared collar portion of the nut collar extends radially outward into the collar chamber, wherein deforming at least a portion of the nut collar includes forming the non-flared collar portion of the nut collar to define a non-flared collar diameter smaller than a diameter of the second bore opening such that a first gap is defined between the non-flared collar portion and the second bore opening, forming the flared collar portion of the nut collar to define a flared collar diameter smaller than a chamber diameter of the collar chamber such that a second gap is defined between the flared collar portion and a sidewall of the collar chamber, and wherein the first and second gaps provide for movement of the nut in an axial direction and a radial direction relative to the VTG lever while the nut is movably attached to the VTG lever, wherein the flared collar diameter of the nut collar is larger than the diameter of the second bore opening;

inserting a ball stud through the ball stud bore such that a threaded shaft portion of the ball stud engages with the nut collar of the nut;

aligning the threaded shaft portion of the ball stud with the nut collar of the nut, the flared collar portion and a non-flared collar portion of the nut collar adjusting the position of the nut in the axial direction and the radial direction based on engagement of the nut collar with the threaded shaft portion of the ball stud; and fastening the nut onto the threaded shaft portion of the ball stud, the nut residing at least partially within a nut recess formed in the second side of the VTG lever such that the nut remains in alignment with the ball stud extending through the ball stud bore, and the fastening of the nut to the ball stud fixedly couples the ball stud to the VTG lever.

13. The method of claim 12, wherein inserting the ball stud through the ball stud bore further includes a ball portion at least partially disposed in an actuator linkage to define a linkage joint of the actuator assembly.

* * * * *